(12) United States Patent
Gadhave et al.

(10) Patent No.: US 12,323,186 B2
(45) Date of Patent: Jun. 3, 2025

(54) METHOD OF MANAGING OPTICAL FIBER CONNECTIVITY AND SYSTEM FOR USING THE SAME

(71) Applicant: RAKUTEN SYMPHONY, INC., Tokyo (JP)

(72) Inventors: Shubhangi Gadhave, Indore (IN); Shahid Khan, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/006,151

(22) PCT Filed: Nov. 15, 2022

(86) PCT No.: PCT/US2022/049903
§ 371 (c)(1),
(2) Date: Jan. 20, 2023

(87) PCT Pub. No.: WO2024/107174
PCT Pub. Date: May 23, 2024

(65) Prior Publication Data
US 2025/0096896 A1   Mar. 20, 2025

(51) Int. Cl.
*H04B 10/00* (2013.01)
*H04B 10/25* (2013.01)
*H04B 10/27* (2013.01)
*H04J 14/00* (2006.01)

(52) U.S. Cl.
CPC ............ *H04B 10/27* (2013.01); *H04B 10/25* (2013.01)

(58) Field of Classification Search
CPC ...................................................... H04B 10/27
See application file for complete search history.

(56) References Cited

U.S. PATENT DOCUMENTS

| | | | |
|---|---|---|---|
| 10,432,311 B1* | 10/2019 | Poon ...................... | H04B 10/27 |
| 2012/0328162 A1* | 12/2012 | Nielsen .................. | G06Q 10/20 |
| | | | 382/113 |
| 2014/0016936 A1* | 1/2014 | Cui ....................... | H04B 10/278 |
| | | | 398/66 |

* cited by examiner

*Primary Examiner* — Daniel G Dobson
(74) *Attorney, Agent, or Firm* — HAUPTMAN HAM, LLP (57) ABSTRACT

An optical fiber connectivity management system includes a non-transitory computer readable medium configured to store instructions thereon; and a processor connected to the non-transitory computer readable medium. The processor is configured to execute the instructions for receiving optical fiber data related to a plurality of target areas for optical fiber connection. The processor is further configured to execute the instructions for preparing a plurality of optical fiber connection requests corresponding to the plurality of target areas for the optical fiber connection and generating an optical fiber application based on the plurality of optical fiber connection requests. The processor is further configured to execute the instructions for instructing a transmitter to transmit the optical fiber application to an optical fiber provider and receiving a response from the optical fiber provider, the response indicating whether the plurality of optical fiber connection requests is approved for optical fiber connection construction.

20 Claims, 6 Drawing Sheets

| 402 | 404 | 406 Target Site Information | 408 Base Station Information | 410 Group Center Information | 412 ID | 414 Expected Opening Date | 416 Construction Date |
|---|---|---|---|---|---|---|---|
| Triggered | Prepare Optical Fiber Application / Mandatory Manager | • | • | ○ | ○ | ○ | ○ |
| Prepared | Approve Optical Fiber Application / Mandatory Manager | • | • | ○ | ○ | ○ | ○ |
| Approved | Complete Optical Fiber Application / Mandatory Manager | • | • | • | • | ○ | ○ |
| Expected Opening Date | Adjust Schedule / Mandatory Manager | • | • | • | • | • | • |
| Schedule Adjusted | Set Construction Date / Mandatory Manager | • | • | • | • | • | • |
|  | Confirm Construction / Mandatory Manager | • | • | • | • | • | • |

METHOD OF MANAGING OPTICAL FIBER CONNECTIVITY AND SYSTEM FOR USING THE SAME

RELATED APPLICATIONS

The present application is a National Phase of International Application No. PCT/US2022/049903, filed Nov. 15, 2022.

TECHNICAL FIELD

This description relates to a method of managing optical fiber connectivity and a system for using the same.

BACKGROUND

In the telecommunication industry, optical fiber providers install optical fibers for fiber-optic communications. Some optical fibers that are not currently in use for transmitting information in the form of light pulses are referred as dark fibers. When a telecommunication service provider looks to expand service at a desired area that currently has no optical fiber connectivity for fiber-optic communications, the telecommunication service provider raises a request to the optical fiber provider to allocate dark fibers for optical fiber connectivity between a base station and a server. Upon approval, the telecommunication service provider contracts to open a construction line at the desired area to obtain the optical fiber connectivity to connect a base station to the rest of the telecommunication network.

SUMMARY

In some embodiments, a system includes a non-transitory computer readable medium configured to store instructions thereon. The system further includes a processor connected to the non-transitory computer readable medium. The processor is configured to execute the instructions for receiving optical fiber data related to a plurality of target areas for allocating optical fiber connectivity. The processor is further configured to execute the instructions for preparing a plurality of optical fiber connectivity requests corresponding to the plurality of target areas. The processor is further configured to execute the instructions for generating an optical fiber connectivity application based on the plurality of optical fiber connectivity requests. The processor is further configured to execute the instructions for instructing a transmitter to transmit the optical fiber connectivity application to an optical fiber provider. The processor is further configured to execute the instructions for receiving a response from the optical fiber provider, the response indicating whether the plurality of optical fiber connectivity requests is approved for optical fiber connectivity construction.

In some embodiments, a method includes receiving optical fiber data related to a plurality of target areas for allocating optical fiber connectivity. The method further includes preparing a plurality of optical fiber connectivity requests corresponding to the plurality of target areas. The method further includes generating an optical fiber connectivity application based on the plurality of optical fiber connectivity requests. The method further includes instructing a transmitter to transmit the optical fiber connectivity application to an optical fiber provider. The method further includes receiving a response from the optical fiber provider, the response indicating whether the plurality of optical fiber connectivity requests is approved for optical fiber connectivity construction. In some embodiments, the method further includes updating the optical fiber connectivity application based on the data received from the optical fiber provider. In some embodiments, the method further includes determining whether the response from the optical fiber provider is a positive response that the plurality of optical fiber connectivity requests is approved or a negative response that the plurality of optical fiber connectivity requests is not approved.

In some embodiments, a non-transitory computer readable medium configured to store instructions for causing a processor executing the instructions to implement a method. The instructions cause the processor to receive optical fiber data related to a plurality of target areas for optical fiber connectivity. The instructions further cause the processor to prepare a plurality of optical fiber connectivity requests corresponding to the plurality of target areas for the optical fiber connectivity. The instructions further cause the processor to generate an optical fiber connectivity application based on the plurality of optical fiber connectivity requests. The instructions further cause the processor to instruct a transmitter to transmit the optical fiber connectivity application to an optical fiber provider. The instructions further cause the processor to receive a response from the optical fiber provider, the response indicating whether the plurality of optical fiber connectivity requests is approved for optical fiber connectivity construction.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

When a telecommunication service provider selects a desired area for establishing new base stations for a telecommunication network, a request is filed to an optical fiber provider for opening a site construction. The desired area often includes a plurality of target sites for construction, and because every target site construction is approved individually, a plurality of requests for the plurality of target sites is submitted to an optical fiber provider. In such a case, a large number of requests are manually prepared and submitted to the optical fiber provider for approval, in some approaches.

Each of the requests is manually prepared for submission and manually monitored after submission by workers in the service provider until the requests are approved by the optical fiber provider. Each of the requests undergoes multiple different levels of review/approval, for example, a request is often reviewed by a team leader, a manager, a department manager, and then a finance manager, prior to final approval. Failure to timely identify and address any new information or updated information requests at any of these levels delays the final approval, which in turn delays the expansion of the telecommunication network. Delays for the expansion of the telecommunication network negative impacts users of the telecommunication network. The optical fiber connectivity requests are managed in an spreadsheet form, such as Excel®, in some approaches. If a response from the reviewing person/department is negative, for example, a task is rejected or requires modifications, a worker who is working on this request will manually identify the negative response and upload the details of the response to the spreadsheet form and modify information in the spreadsheet form to resubmit the request. Due to a large number of the filed requests, manual input and tracking of the optical fiber connectivity is time consuming and management of the optical fiber connectivity request is not efficient. The lack of efficiency causes delays in planned network expansion so customers are more likely to suffer poor quality in areas where the network has not yet expanded.

A system is provided with a workflow along tracking of optical fiber connectivity requests to improve the efficiency of managing the optical fiber connectivity. The system is able to initiate a workflow for preparing an optical fiber connectivity request as soon as a technician determines that a site is a target site for construction. At the same time, for example, the service provider is able to discuss a lease contract with a company who may be interested in renting the fiber-optic communication network that will be established at the target site later.

The system automatically identifies and imports data from a non-transitory computer readable medium to prepare an optical fiber connectivity request. The system is able to directly communicate with an external device, such as a server of an optical fiber provider, to retrieve information and to report progress of the application. Information sent from the external device is automatically saved and recorded in the system. The system is also allows human interaction to modify the optical fiber connective request. In addition, the system is able to handle preparation of bulk optical fiber connectivity requests, generate an optical fiber connectivity application for the bulk optical fiber connectivity requests, transmit the optical fiber connectivity application to an optical fiber provider, and monitor the bulk optical fiber connectivity requests in the optical fiber connectivity application. When the optical fiber connectivity application is approved, a team at the telecommunication service provider is able to be automatically notified to start construction at the target sites indicated in the optical fiber connectivity requests and the optical fibers will be ready for use. The system allows the telecommunication service provider to control a process of the optical fiber connectivity application with a reduced latency time at a high level of data security. As a result, expansion of the telecommunication network is more efficient and customers of the network are able to experience improved quality of service in a wider geographic area.

Figure 1:
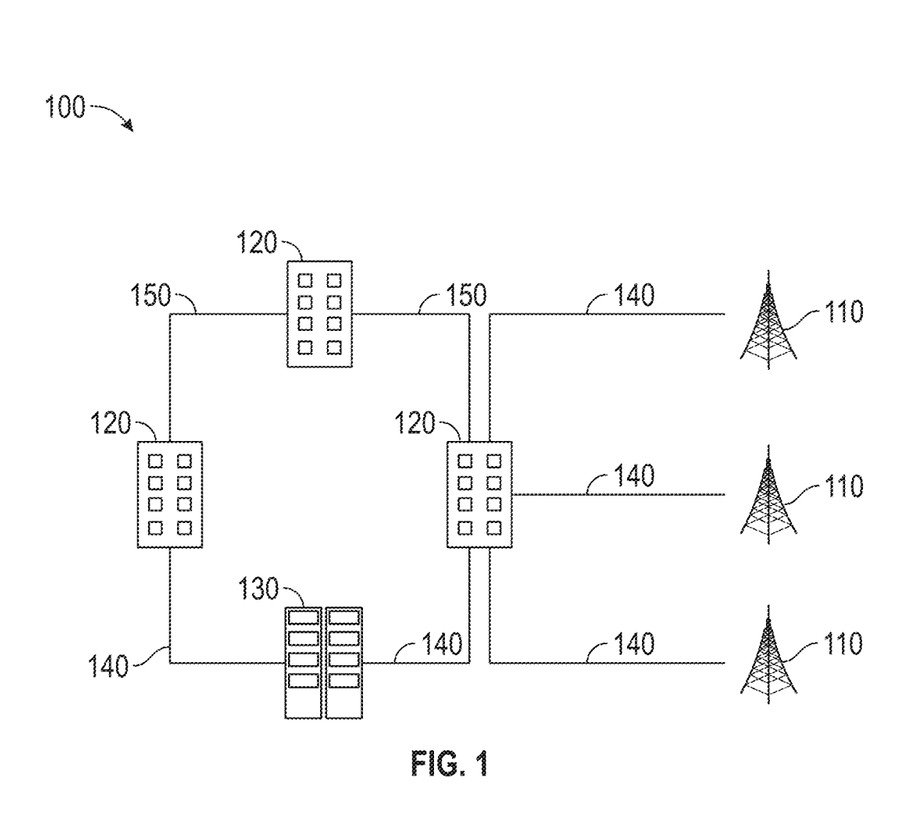
FIG. 1 is a schematic diagram of a telecommunication network in accordance with some embodiments.

FIG. 1 is a schematic diagram of a telecommunication network 100 in accordance with some embodiments. The telecommunication network 100 includes a plurality of base stations 110, a plurality of group centers 120, and a data center 130. Optical fibers providing connectivity for customers, i.e., through the one or more base stations 110, to the data center 130 are referred as front haul optical fibers 140. Optical fibers, which provide a direct connectivity to a database, i.e., group centers 120, are referred as back haul optical fibers 150. The back haul optical fibers are used as a medium to connect one or more group centers 120 to one or more base stations 110 and the data center 130. In some embodiments, a structure of each of the back haul optical fibers 150 is a same structure as each of the front haul optical fibers 140. In some embodiments, a structure of at least one back haul optical fiber 150 differs from a structure of at least one front haul optical fiber 140.

In some embodiments, locations for proposed new front haul optical fibers 140 are available to be selected by a telecommunication service provider to expand a telecommunication network. For example, in some embodiments, in response to a determination to add a new base station 110, a new front haul optical fiber 140 is selected to connect the new base station 110 to a corresponding group center 120.

In some embodiments, the group centers 120 is segmented into group centers, such as an East region and West region. Each of the East and West regions includes districts or prefectures and every district or prefecture is designated with a predetermined identification number. Each of the group centers 120 includes a processor and a non-transitory computer readable medium for storing data of the districts or prefectures in the corresponding East or West region. When an area is selected for optical fiber connectivity construction, one or more sites included in the area are identified and the corresponding group centers 120 are selectable to provide data for the one or more sites included in the area.

Similar to the group centers 120, the data center 130 also includes a processor and a non-transitory computer readable medium. In some embodiments, the data center 130 is integrated into one or more group centers 120. In some embodiments, the data center 130 is segmented from each of the group centers 120. The data center 130 provides access to information, such as the Internet, for users connected to the base stations 110 of the telecommunication network.

Figure 2:
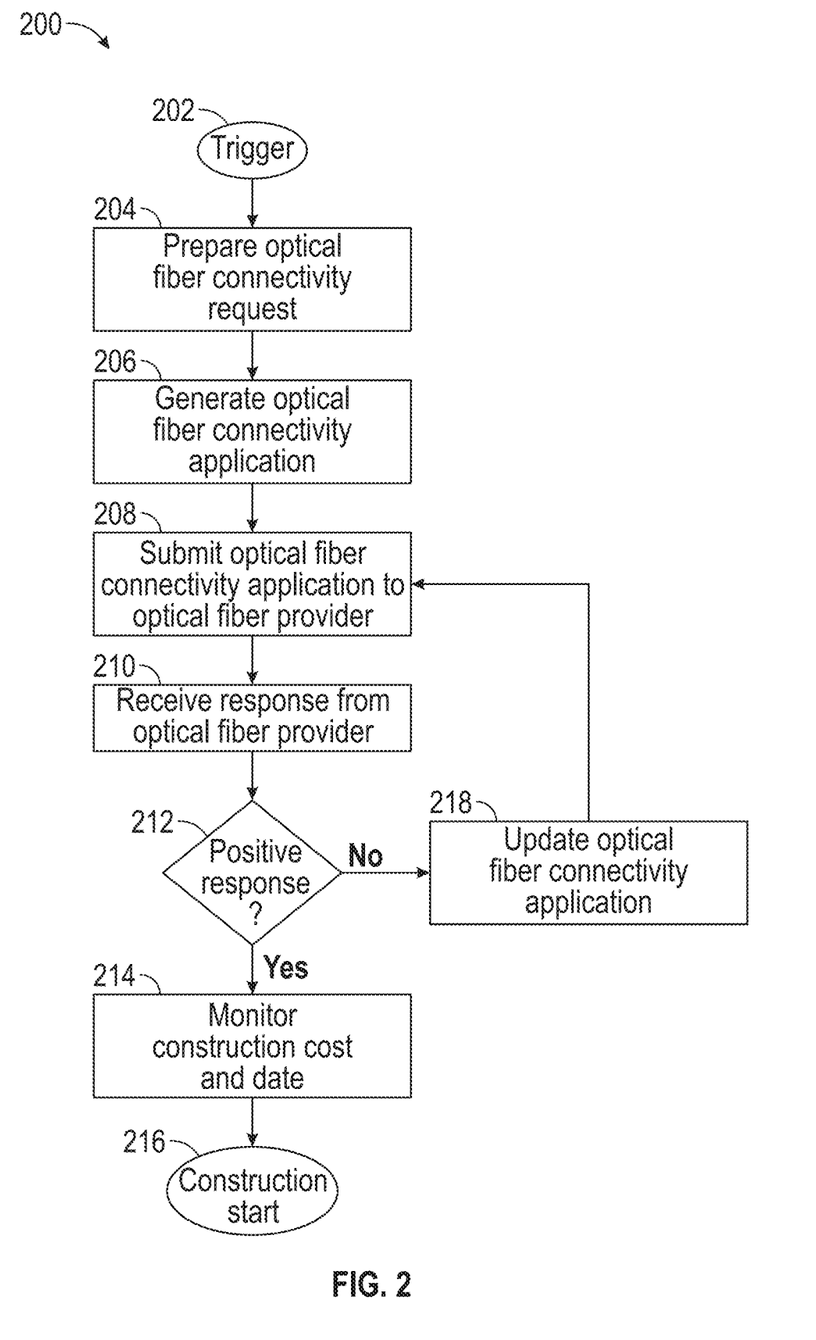
FIG. 2 is a flowchart of a method of managing optical fiber installation in accordance with some embodiments.

FIG. 2 is a flowchart of a method 200 of managing optical fiber installation in accordance with some embodiments. In some embodiments, the method 200 is implemented to expand the telecommunication network 100 (FIG. 1). In some embodiments, the method 200 is implemented for a telecommunication network other than the telecommunication network 100 (FIG. 1). In some embodiments, the method 200 is implementable by a telecommunication service provider, e.g., a service provider of telecommunication network 100 (FIG. 1), to obtain an approval from an optical fiber provider to install or allocate optical fiber connectivity of the front haul optical fiber 140 so that the optical fiber connectivity at a target site, e.g., one or more base station 110 (FIG. 1), is able to be established. Method 200 is able to collect data from a non-transitory computer readable medium of one or more group centers, e.g., group centers 120 (FIG. 1), to prepare one or more requests for one or more target sites, generate an application including the one or more requests, and transmit the generated application to an external device, such as a server of an optical fiber provider. Method 200 is also able to receive feedback from the external device and update the application until construction of one or more target sites is started.

Method 200 includes operation 202 in which an optical fiber connectivity request is triggered. In some embodiments, when an area is selected for constructing a fiber-optic communication network, the service provider assigns a technical engineer to visit a target site in the selected area and conduct a technical site survey to determine whether the target site is a candidate for construction. A result of the determination is transmitted to a system that is able to implement method 200. In response to the target site being determined as a candidate for construction, an optical fiber connectivity request for the target site is triggered. In some embodiments, the operation 202 is performed automatically in response to receiving information indicating that a target site is a candidate for construction.

In some embodiments, a selected area includes a plurality of target sites that are determined as candidates for construction, a plurality of optical fiber connectivity requests corresponding to the one or more target sites is triggered. In some embodiments, some of the plurality of target sites are determined as candidates for construction while other target sites in the same area are still under evaluation, optical fiber connectivity requests for the plurality of candidate target sites are triggered. Optical fiber connectivity requests for the other target sites under evaluation will be triggered in response to the other target sites being determined as candidates for construction.

Method 200 includes operation 204 in which an optical fiber connectivity request is prepared for an optical fiber connectivity application. In some embodiments, the optical fiber connectivity request is prepared by collecting data from one or more group centers 120 corresponding to the target site requested for optical fiber connectivity. In some embodiments, the collected data includes information of the base station(s) 110 in the selected area, such as base station names, equipment to be installed at the base station, base station types, or other suitable information. The collected data further includes information of the target site from the corresponding group center(s) 120, such as, but not limited to, district or prefecture name, official name of a city, commonly known name of the city, street number, block number, building name, nearest utility pole name, and name of an optical fiber provider branch.

In some embodiments, in a case that a large number of the target sites in an area is determined for construction, operation 204 prepares bulk optical fiber connectivity requests for the target sites at the same time. By preparing requests for multiple target sites simultaneously, efficiency of expanding the telecommunication network is increased and customer satisfaction is also increased as a result.

Method 200 includes operation 206 in which an optical fiber connectivity application is generated. The optical fiber connectivity application is generated to include one or more optical fiber connectivity requests prepared in operation 204.

In some embodiments, an optical fiber connectivity application is generated as a CSV (Comma Separated Values) file acceptable by an optical fiber provider. In some embodiments, the optical fiber connectivity application is generated in a different format to meet a requirement of the optical fiber provider. In some embodiments, in response to a large number of optical fiber connectivity requests being prepared in operation 204, operation 206 generates an optical fiber connectivity application including all of the prepared optical fiber connectivity requests. In some embodiments, operation 206 allows a user to select one or more of the optical fiber connectivity requests and generate an optical fiber connectivity application including the selected one or more of the optical fiber connectivity requests.

Method 200 includes operation 208 in which the optical fiber connectivity application generated in operation 206 is submitted to an external device, such as a server of an optical fiber provider. The optical fiber connectivity application is transmitted via an internet network to the server of the optical fiber provider. In some embodiments, the optical fiber connectivity application is transmitted wirelessly. In some embodiments, the optical fiber connectivity application is transmitted via a wired connection.

Method 200 includes operation 210 in which a response is received from the external device, such as a server of an optical fiber provider. The response includes a feedback on the optical fiber connectivity application submitted in operation 208. In an optical fiber connectivity application including multiple optical fiber connectivity requests, the response from the optical fiber provider includes a feedback on each of the optical fiber connectivity requests.

The response includes an application ID assigned by the optical fiber provider to the optical fiber connectivity application. The application ID is relied on to monitor or update the optical fiber connectivity application.

The response further includes one or more unique IDs respectively assigned to one or more optical fiber connectivity requests in the optical fiber connectivity application. The unique ID is usable to track the corresponding request in the optical fiber connectivity application. For example, in a case that 10 requests for 10 target sites are included in an optical fiber connectivity application, the response includes 10 unique IDs corresponding to the 10 requests in the application. Information related to the unique IDs and the corresponding requests are stored in a non-transitory computer readable medium of a system that is able to implement method 200. In some embodiments, in response to a change being made to one or more requests, an update of the change is automatically provided to the telecommunication service provider.

Method 200 includes operation 212 in which a determination is made as to whether the response from the optical fiber provider is a positive response. In some embodiments, a positive response indicates that the optical fiber connectivity application is approved. In a case that an optical fiber connectivity application including a plurality of optical fiber connectivity requests, a positive response from the optical fiber provider includes approvals on the optical fiber connectivity requests, respectively. In some embodiments, numerous positive responses are provided as the optical fiber connectivity application progresses through various levels of approval, e.g., from a team leader, a manager, a department manager, etc. In such a case, each of the positive responses is automatically updated in the optical fiber connectivity application, in some embodiments.

In response to a determination that the response is not positive, i.e., negative, at operation 212, method 200 proceeds to operation 218. In operation 218, the optical fiber connectivity application is updated to address concerns raised by the negative response received in operation 210. In some embodiments, a negative response indicates an uncompleted application, such as, but not limited to, information being missing in one or more optical fiber connectivity requests. In some embodiments, a negative response indicates a rejected application, such as, one or more target sites identified in the optical fiber connectivity requests are unable to proceed further; and therefore, an alternative plan for selecting the target sites is provided. Operation 218 is able to identify which one of the requests in the optical fiber connectivity application includes missing information by relying on the unique ID assigned to the optical fiber connectivity request and then update the optical fiber connectivity application by filling in the missing information for the one of the requests. In some embodiments, in operation 218, a notification, such as an email or a text message, is created and sent to prompt a responsible worker to review the negative response and revise the optical fiber connectivity application accordingly. In some embodiments, a system that is able to implement method 200 provides recommend information to address the concerns of a negative response or automatically generates a request for additional information sought by the negative response. In some embodiments, the recommendation information is based on previous applications the experience a rejection at a similar stage as the application proceeding through method 200.

In response to the optical fiber connectivity application being updated in operation 218, method 200 proceed to operation 208 in which the updated application is transmitted to the optical fiber provider again for review and approval.

In response to a determination that the response is positive in operation 212, method 200 proceeds to operation 214. A positive response indicates that one or more optical fiber connectivity requests in the optical fiber connectivity application is approved by the optical fiber provider. In operation 214, a construction date for the target site is monitored. In some embodiments, the information regarding the construction date includes, but not limited to, possible construction day(s), team available date(s), expected dates of construction, construction date, and target site opening date. In some embodiments, when a construction is delayed for some reasons, operation 214 is able to monitor the delay. For instances, reasons for causing the delay are imported to the system implementing the operation 214. In some embodiments, operation 214 tracks information regarding a construction cost for one or more of the target sites. For instances, a financial manager is allowed to review, revise a construction cost in operation 214. In some embodiments, in response to a construction cost for a target site requested in the optical fiber connectivity application being modified, operation 214 automatically updates the application. In some embodiments, operation 214 periodically updates cost information and automatically transmits, e.g., by a transmitter, the updated information to a computer or a server. In some embodiments, operation 214 automatically transmits updated cost information to a computer or a server in response to an expected date for construction or site opening being within a threshold time frame of a current date. In some embodiments, operation 214 automatically transmits updated cost information to a computer or a server in response to a deadline set for finalizing the construction cost passing.

Method 200 includes operation 216 in which construction at the target site(s) starts. In operation 216, a command is transmitted, e.g., by a transmitter, to instruct a construction team to start the construction of the target site(s) identified in the approved optical fiber connectivity application. An instruction transmitted to the construction team includes information such as permits, materials, etc., in some embodiments. In some embodiments, the instruction is transmitted wirelessly. In some embodiments, the instruction is transmitted via a wired connection.

Method 200 provides a workflow from initiation of an optical fiber connectivity request for allocating optical fiber connectivity at a target site to construction of the target site. The workflow in method 200 is able to implement bulk optical fiber connectivity requests for a large number of target sites, for example, 100 target sites, 200 target sites, etc., in one optical fiber connectivity application.

Figure 3:
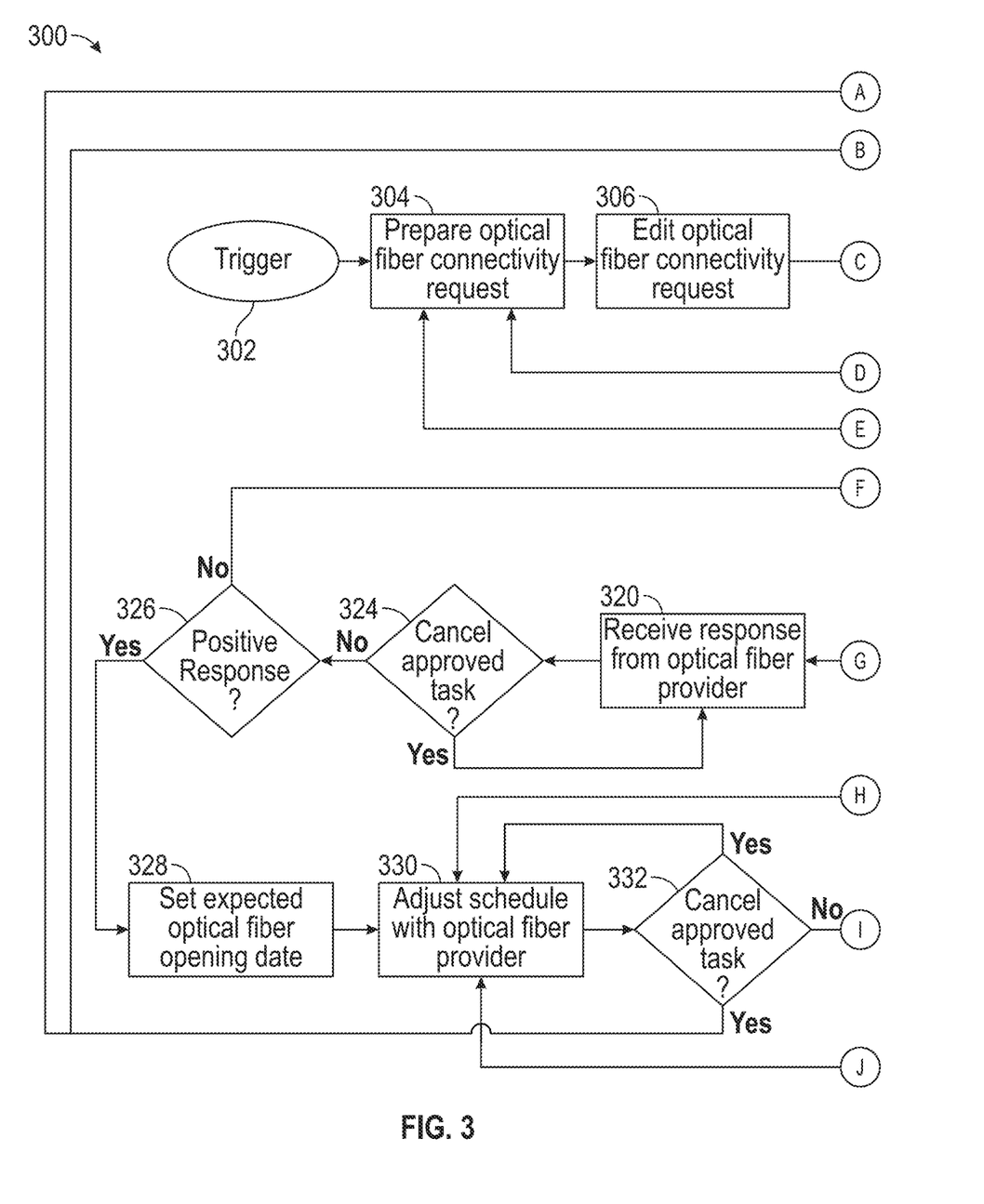
FIG. 3 is a flowchart of a method of managing optical fiber connectivity in accordance with some embodiments.

FIG. 3 is a flowchart of a method 300 of managing optical fiber connectivity in accordance with some embodiments. Method 300 is similar to method 200 (FIG. 2) with additional operations in managing the optical fiber connectivity from a start of an optical fiber connectivity request for constructing a fiber-optic communication network at a target site to construction of the target site. In some embodiments, the method 300 is implemented to expand the telecommunication network 300 (FIG. 1). In some embodiments, the method 200 is implemented for a telecommunication network other than the telecommunication network 100 (FIG. 1).

Method 300 includes operation 302 which is similar to operation 202 of method 200 according to some embodiments. In operation 302, an optical fiber connectivity request is triggered in response to a target site is determined as a candidate for construction.

Method 300 includes operation 304. In operation 304, an optical fiber connectivity request is prepared similar to operation 204 of method 200. In response to a plurality of optical fiber connectivity requests being triggered in operation 303, data for the plurality of optical fiber connectivity requests is imported from group center(s), e.g., group center (s) 120 (FIG. 1), corresponding to the target site. In some embodiments, the operation 304 is implementable by importing data from an spreadsheet form, or a form in another suitable format.

Method 300 includes operation 306 in which the optical fiber connectivity requests prepared in the operation 304 are edited. In some embodiments, data in the prepared optical fiber connectivity requests is edited by a worker of the service provider. In some embodiments, a system that is able to implement method 300 automatically provides some guidance for the editing to be made to the requests. In some embodiments, a pop-up window or box including selectable texts or a clickable link to connect to a database is provided.

Method 300 includes operation 308 in which a determination is made as to whether the prepared optical fiber connectivity request is approved. In some embodiments, each of the requests undergoes multiple different levels of review/approval, for example, a request is often reviewed by a team leader, a manager, a department manager, and then a finance manager, prior to final approval. In some embodiments, a manager of the service provider reviews and approves the prepared request. In response to the prepared optical fiber connectivity request is not approved, operation 308 proceeds to operation 304 to prepare the optical fiber connectivity request. In some embodiments, the optical fiber connectivity request is not approved due to missing certain document or information in operation 308, the request is re-prepared in operation 304 by filling in the missed information or attaching the missed document to the request. In response to the prepared optical fiber connectivity request is approved, operation 308 proceeds to operation 310.

In operation 310, a group center, e.g., group center 120 in FIG. 1, is selected according to a location of the target site included in the prepared optical fiber connectivity request. The group center stores data of the corresponding target sites. Upon selection of one or more of the group centers, data of the corresponding target sites are imported into the optical fiber connectivity request. In some embodiments, data of the corresponding target sites are automatically imported into the optical fiber connectivity request, e.g., from a database.

Method 300 includes operation 312 in which a determination is made as to whether the prepared optical fiber connectivity request is completed. In response to determining the prepared optical fiber connectivity request being not completed, operation 312 proceeds to operation 304 to re-prepare the optical fiber connectivity request. In response to determining the prepared optical fiber connectivity request being completed, operation 312 proceeds to operation 314 in which an optical fiber connectivity application is generated.

Operation 314 of method 300 is similar to operation 206 of method 200 according to some embodiments. Further, in some embodiments, a system task is generated corresponding to the generation of the optical fiber connectivity application.

Method 300 includes operation 316 in which the generated optical fiber connectivity application is submitted to an external device, such as a server of an optical fiber provider. Operation 316 of the method 300 is similar to operation 208 of the method 200 according to some embodiments. In some embodiments, operation 316 further includes downloading the generated optical fiber connectivity application. In some instances, a manager of the service provider downloads the generated optical fiber connectivity application, e.g., a CSV file, to determine if further changes are requested. In some embodiments, operation 316 includes uploading an optical fiber connectivity application. In some instances, a manager uploads an optical fiber connectivity application to a computer in the system that implements method 300.

In some embodiments, based on a location of a target site requested in an optical fiber connectivity application, the optical fiber connectivity application is generated differently for the East region and the West region.

Method 300 includes operation 318 in which a determination is made as to whether a group center 120 is to be changed. The generated optical fiber connectivity application includes information of one or more target sites requested for constructing a fiber-optic communication network and corresponding to one or more group centers. In some embodiments, a review is conducted to determine whether a group center in the generated optical fiber connectivity application should be changed. For example, if a group center selected for an optical fiber connectivity application is determined as not corresponding to the target site requested in the application for construction, the group center is determined to be changed. In some embodiments, a manager of the service provider is allowed to review the generated optical fiber connectivity application. In some embodiments, a group center is determined to be changed in response to the group center not corresponding to the target site requested in the application for construction, a new group center that is closer to the target site is activated, or other suitable conditions.

In response to a determination that the group center is to be changed, operation 318 proceeds to operation 310 in which a group center is selected to complete optical fiber connectivity request.

In response to a determination that the group center is not to be changed, operation 318 proceeds to operation 320 in which a response is received from an external device, such as a server of an optical fiber provider. Operation 320 of the method 300 is similar to operation 210 of the method 200 according to some embodiments.

Method 300 includes operation 324 in which a determination is made as to whether the system task generated at operation 314 is to be cancelled. This operation 324 allows the service provider to determine whether the generated optical fiber connectivity application should proceed further.

In some embodiments, in a case that a response received from the optical fiber provider indicates that the optical fiber connectivity application is rejected by the optical fiber provider, operation 324 determines that the system task corresponding to the optical fiber connectivity application is to be cancelled. In response to determining the system task being cancelled, operation 324 proceeds to operation 320 in a loop until a determination is made that the system task is not to be cancelled.

In some embodiments, in a case that a response received from the optical fiber provider indicates that the optical fiber connectivity application is not rejected by the optical fiber provider, operation 324 determines that the system task corresponding to the optical fiber connectivity application is not to be cancelled, e.g., approved or continued. In some embodiments, a manager of the service provider approves the system task.

In response to a determination that the system task is not cancelled but approved, operation 324 proceeds to operation 326 in which a determination is made as to whether a response received from the optical fiber provider is positive.

In response to a determination that the response is not positive, for instance, the group center selected for the optical fiber connectivity application is not correct, operation 326 proceeds to operation 310 to re-select a group center and complete the optical fiber connectivity request. In some embodiments, in response to operation 326 determining that the response is not positive, a result of the determination is automatically updated in the application and recommendation information is provided. In response to a determination that the response is positive, operation 326 proceeds to operation 328 in which an expected optical fiber opening date is set. An expected optical fiber opening date is a date that the optical fibers are in use to transmit information in a fiber-optic communication network.

Operation 328 includes receiving data from an external device, such as a server of an optical fiber provider. The received data includes an expected optical fiber opening date corresponding to a target site requested in the optical fiber connectivity application. In some embodiments, the received data includes multiple expected opening dates for multiple target sites requested in the optical fiber connectivity application, respectively. Further, the received data includes a construction ID corresponding to a target site requested in the optical fiber connectivity application. In some embodiments, the received data includes multiple construction IDs for multiple target sites requested in the optical fiber connectivity application, respectively.

Method 300 includes operation 330 in which a schedule of an optical fiber opening is adjusted. After an expected optical fiber opening date is set in operation 328, a modification to the expected optical fiber opening date is possibly made in operation 330. In some embodiments, operation 330 transmits a request to the optical fiber provider to adjust the expected optical fiber opening date. In some embodiments, operation 300 transmits several requests to the optical fiber provider to adjust the optical fiber opening date until the adjustment of the optical fiber opening date is completed, for example, approved by the optical fiber provider.

Method 300 includes operation 332 in which a determination is made as to whether the system task created at operation 314 is to be cancelled. Cancelation of the system task is determined based on different criteria, such as a possible construction delay, a lack of sufficient materials, unsolved supply chain issues, etc., in some embodiments. In some embodiments, a manager of the service provider reviews the system task. In some instances, when a manager does not approve the optical fiber opening date adjusted in operation 330, operation 332 determines that the system task is cancelled. In response to determining the system task being cancelled, operation 322 proceeds to operation 330 to adjust the optical fiber opening date. In response to determining the system task being not cancelled, operation 332 proceeds to operation 334 in which a construction date is set.

Operation 334 includes receiving data from an external device, such as a server of an optical fiber provider. The received data includes a set construction date that a construction at a target site requested in the optical fiber connectivity application begins. In some embodiments, the optical fiber connectivity application is automatically updated the received data. In some embodiments, the received data includes multiple construction dates for construction at multiple target sites requested in the optical fiber connectivity application, respectively. In some embodiments, data is received from the external device wirelessly. In some embodiments, data is received from the external device via a wired connection.

Method 300 includes operation 336 in which a determination is made as to whether the set construction date is to be cancelled or rescheduled. Cancelation or rescheduling of the system task is determined based on different criteria, such as a possible construction delay, a lack of sufficient materials, unsolved supply chain issues, etc., in some embodiments. In some embodiments, a manager of the service provider reviews the set construction date. In response to determining the construction date being cancelled or rescheduled, operation 336 proceeds to operation 330 to adjust the construction date with the optical fiber provider. In response to determining the construction date being not cancelled or rescheduled, operation 336 proceeds to operation 338.

In operation 338, a determination is made as to whether the construction date and the opening date at a target site requested in the optical fiber connectivity application are confirmed. In some embodiments, a manager of the service provider reviews and confirms the construction date and the opening date. In response to a determination that at least one of the construction date or the opening date is to be changed, operation 338 proceeds to operation 330 to adjust the construction date and/or opening date with the optical fiber provider. In response to a determination that the construction date and opening date are not to be changed, the construction date and the opening date are confirmed and operation 338 proceeds to operation 340. A result of the determination is automatically updated in the corresponding optical fiber connectivity application, in some embodiments.

In operation 340, a command to start the construction is transmitted to an external device. In some embodiments, the external device is a computer or a server managing construction of a target site. In some embodiments, operation 340 includes transmitting, e.g., by a transmitter, a plurality of commands to an external device to prompt a start of construction at a plurality of target sites. In some embodiments, operation 340 includes transmitting a message to a manager who is responsible for the construction to start construction at one or more target sites. When the construction is started in operation 340, the optical fiber connectivity is completed. In some embodiments, the optical fiber connectivity application is automatically updated with information indicating that the construction that is started and/or completed.

Additional operations are included in method 300 in some embodiments. For example, in some embodiments, a determination of a construction cost is included in method 300. In some embodiment, at least one operation is omitted from method 300. For example, in some embodiments, operation 302 for triggering an optical fiber connectivity request is omitted from method 300.

Figure 4:
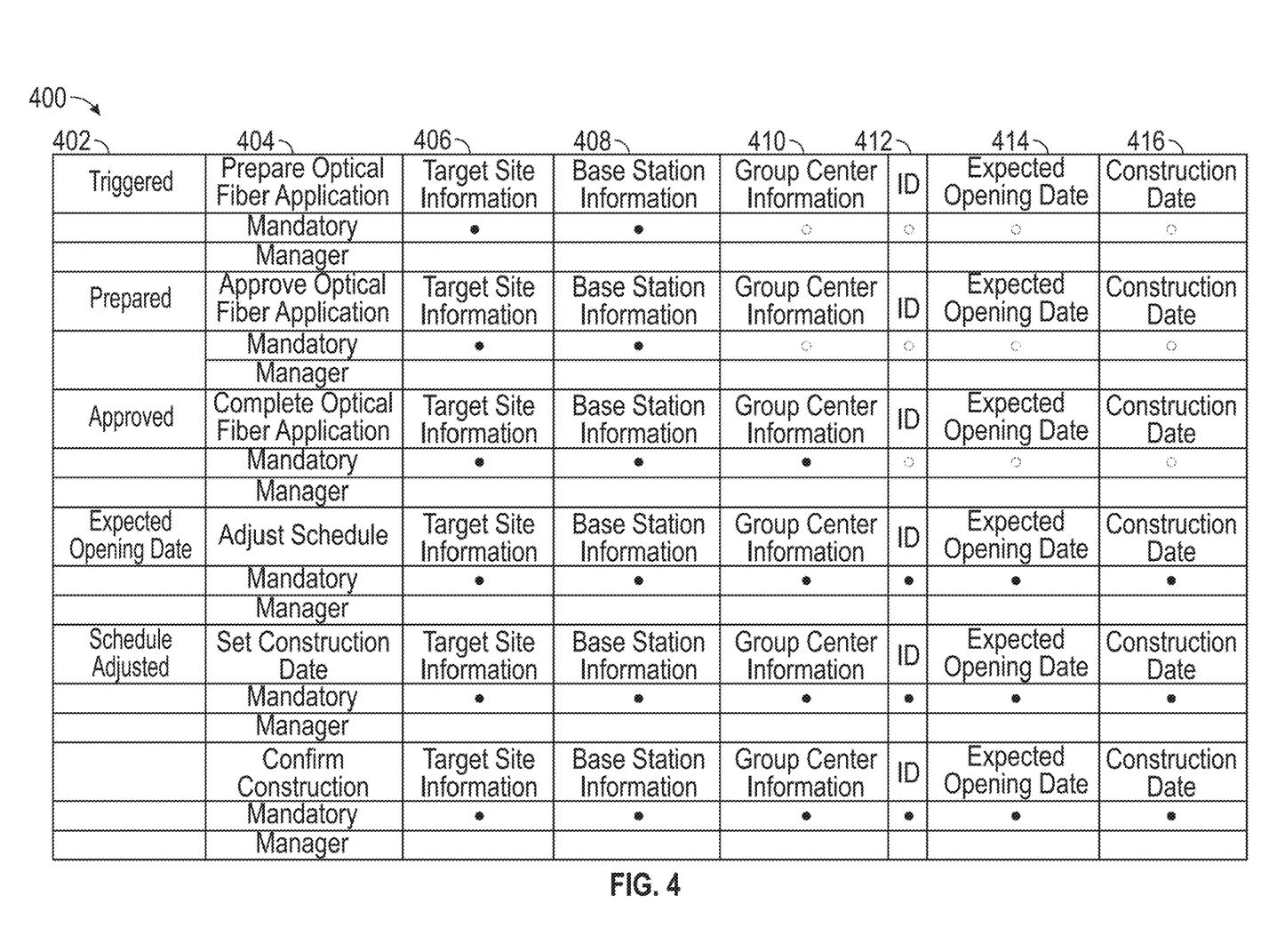
FIG. 4 is a diagram of a user interface for managing optical fiber connectivity in accordance with some embodiments.

FIG. 4 is an example of a user interface (UI) 400 for managing optical fiber connectivity in accordance with some embodiments. In some embodiments, the UI 400 is a graphical UI (GUI) configured to receive information from a user, e.g., via a touch screen or other input/output (I/O) device.

User interface 400 provides information processed in method 200 or method 300 according to some embodiments. In some embodiments, user interface 400 includes a table as shown in FIG. 4.

User interface 400 includes a first section including columns 402 and 404. Columns 402 and 404 indicate a status of an optical fiber connectivity application processed in method 200 or method 300. In some embodiments, an optical fiber connectivity application is processed in method 300, and a status of the optical fiber connectivity application from operation 302 to operation 340 of method 300 is shown in columns 402 and 404, such as "TRIGGERED," "PREPARE OPTICAL FIBER APPLICATION," "PREPARED," "APPROVE OPTICAL FIBER APPLICATION," "APPROVED," "COMPLETE OPTICAL FIBER APPLICATION," "EXPECTED OPENING DATE," "ADJUST SCHEDULE," "SCHEDULE ADJUSTED," "SET CONSTRUCTION DATE," and "CONFIRM CONSTRUCTION."

User interface 400 further includes a second section including a plurality of columns 406, 408, 410, 412, 414, 416. Information corresponding to columns 406, 408, 410, 412, 414, 416 are imported from an internal device, e.g., a computer or a server of a service provider, or an external device, e.g., a server of an optical fiber provider.

Target site information at column 406 includes information related to a target site, for example, a candidate ID, an address of the target site (postal code, prefecture/district, city, street number, building name). Base station information at column 408 includes, but not limited to, base station type and base station name. Group center information at column 410 includes a device type of the device located at a group center or a location of the device. For example, a device located at a group center is a baseband unit (BBU).

The status "TRIGGERED" in column 402 indicates that an optical fiber connectivity request for a target site is triggered. In some embodiments, the optical fiber connectivity request is triggered by operation 202 of the method 200 or operation 302 of method 300. The status "PREPARE OPTICAL FIBER APPLICATION" in column 404 indicates a following status after the optical fiber connectivity request for the target site is triggered, e.g., the request is under preparation. In some embodiments, the optical fiber connectivity request is prepared by operation 204 of method 200 or operations 304, 306, 308, and 310 of method 300. When the optical fiber connectivity request for a target site is being prepared, information in columns 406, 408, and 410 are automatically imported. In some embodiments, a manager is allowed to edit information in columns 406, 408, and 410 in response to determining the prepared request being not approved at operation 308 of the method 300 or in response to determining the prepared request being not completed at operation 312 of method 300.

The status "PREPARED" in column 402 indicates that the optical fiber connectivity request has been prepared. The status "APPROVE OPTICAL FIBER APPLICATION" in column 404 indicates a following status after the optical fiber connectivity request has been prepared, i.e., an optical fiber connectivity application is generated for approval. In some embodiments, the optical fiber connectivity application is generated by operation 206 of method 200 or operation 314 of method 300.

The status "APPROVED" in column 402 indicates that the optical fiber connectivity application is approved. That is, an optical fiber connectivity application is submitted to an optical fiber provider at operation 208 of method 200 or operation 316 of method 300, and a response from the optical fiber provider is received. The response indicates whether the optical fiber connectivity application is approved. The status "COMPLETE OPTICAL FIBER APPLICATION" in column 404 indicates that a following status after receiving the response from the optical fiber provider to complete the optical fiber connectivity application. In some embodiments, a manager is allowed to edit information in columns 406, 408, and 410 in response to determining a negative response being received from the optical fiber provider. For example, group center information in column 410 is editable in response to a negative response received in operations 326 and 310 of method 300. Further, ID in column 412 is received from the optical fiber provider. In some embodiments, the ID in column 412 includes an application ID corresponding to an optical fiber connectivity application and a unique construction ID corresponding to a target site.

The status "EXPECTED OPENING DATE" at column 402 indicates that an expected opening date for a target site is set. In some embodiments, the expected opening date is set at operation 214 of method 200 or operation 328 of method 300. The status "ADJUST SCHEDULE" indicates a following status that the expected opening date is adjusted or adjustable. In some embodiments, an adjustment of the expected opening date is implemented in operations 330 of method 300. For instances, an adjustment of the expected opening date is implemented in operation 330, e.g., an adjusted date is submitted to a server of the optical fiber provider. Further, an expected opening date is adjustable in operation 330 in response to a system task being cancelled in operation 332. Column 414 in user interface 400 includes an expected opening date.

The status "SCHEDULE ADJUSTED" at column 402 indicates that the expected opening date has been adjusted. The status "SET CONSTRUCTION DATE" at column 404 indicates a following status that a construction date is set. In some embodiments, the construction date is set at operation 214 of method 200 or operation 330 of method 300. In some embodiments, a construction date is adjustable in operation 330 in response to the construction date being cancelled or rescheduled in operation 336 of method 300. Column 416 in the user interface 400 includes a construction date.

The status "CONFIRM CONSTRUCTION" at column 404 indicates that a construction date of a target site is confirmed. In some embodiments, a construction date is confirmed at operation 214 of the method 200 or operation 338 of the method 300.

According to some embodiments as illustrated in user interface 400 of FIG. 4, some information are mandatory and some information are optional depending on a status of the optical fiber connectivity application. With respect to "PREPARE OPTICAL FIBER APPLICATION" and "APPROVAL OPTICAL FIBER APPLICATION" at column 404, information in columns 406 and 408 are mandatory and information in columns 410, 412, 414, 416 are optional. With respect to "complete optical fiber application" in column 404, information in column 410, i.e., group center information, is changed from optional to mandatory. With respect to "ADJUST SCHEDULE" "SET CONSTRUCTION DATE" "CONFIRM CONSTRUCTION" in column 404, information in column 412, 414, and 416 is changed from optional to mandatory.

In some embodiments, user interface 400 allows a manger to edit information in columns 406, 408, 410, 412, 414, and 416 at different stages of an optical fiber connectivity application.

In some embodiments, user interface 400 includes additional information that is mandatory or optional. In some embodiments, information of a responsible person is displayed on a user interface and is mandatory. In some embodiments, a delay in construction may occur for some reasons after an opening date is set. In such a case, information regarding a reason causing the delay is displayed on the user interface but is optional.

Figure 5:
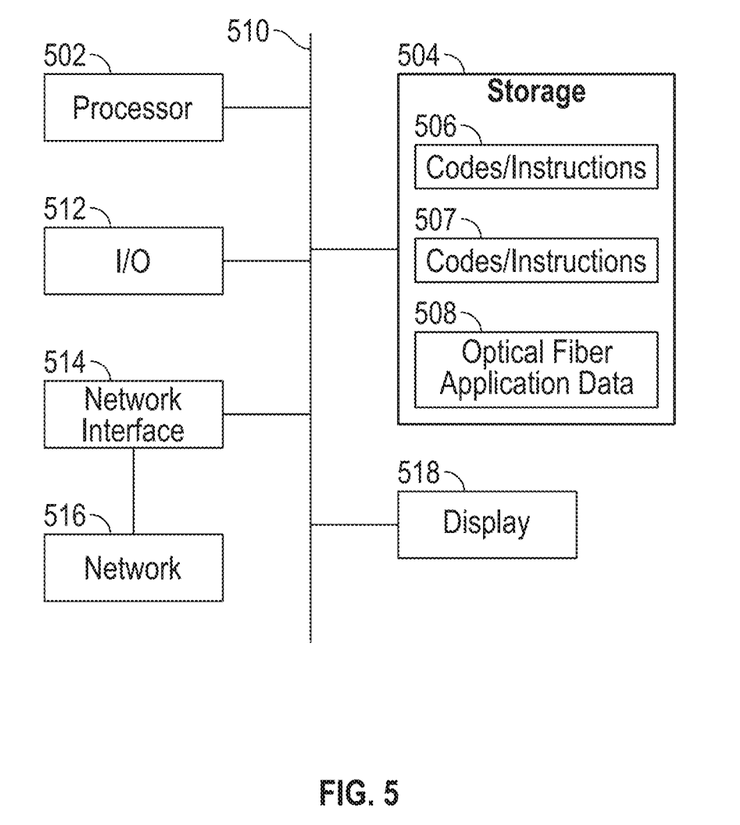
FIG. 5 is a block diagram of a system for managing optical fiber connectivity in accordance with some embodiments.

FIG. 5 is a block diagram of system 500 for managing an optical fiber connectivity in accordance with some embodiments. System 500 includes a hardware processor 502 and a non-transitory computer readable storage medium 504 encoded with, i.e., storing, the computer program code 506, i.e., a set of executable instructions. Computer readable storage medium 504 also stores data 508 related to an optical fiber connectivity application. The processor 502 is electrically coupled to the computer readable storage medium 504 via a bus 510. The processor 502 is also electrically coupled to an I/O interface 512 by bus 510. A network interface 514 is also electrically connected to the processor 502 via bus 510. Network interface 514 is connected to a network 516, so that processor 502 and computer readable storage medium 504 are capable of connecting to external elements via network 514. The processor 502 is configured to execute the computer program code 506 encoded in the computer readable storage medium 504 in order to cause system 500 to be usable for performing a portion or all of the operations as described in method 200 (FIG. 2) or method 300 (FIG. 3). A In some embodiments, the processor 502 is a central processing unit (CPU), a multi-processor, a distributed processing system, an application specific integrated circuit (ASIC), and/or a suitable processing unit.

In some embodiments, the computer readable storage medium 504 is an electronic, magnetic, optical, electromagnetic, infrared, and/or a semiconductor system (or apparatus or device). For example, the computer readable storage medium 504 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 404 includes a compact disk-read only memory (CD-ROM), a compact disk-read/write (CD-R/W), and/or a digital video disc (DVD).

In some embodiments, the storage medium 504 stores the computer program code 506 configured to cause system 500 to perform a portion or all of the operations as described in method 200 (FIG. 2) or method 300 (FIG. 3). In some embodiments, the storage medium 504 also stores information for performing a portion or all of the operations as described in method 200 (FIG. 2) or method 300 (FIG. 3) as well as information generated during performing a portion or all of the operations as described in method 200 (FIG. 2) or method 300 (FIG. 3).

In some embodiments, the storage medium 504 stores instructions 507 for interfacing with external devices. The instructions 507 enable processor 502 to generate and receive instructions readable by the external devices to effectively perform a portion or all of the operations as described in method 200 (FIG. 2) or method 300 (FIG. 3).

System 500 includes I/O interface 512. I/O interface 512 is coupled to external circuitry. In some embodiments, I/O interface 512 includes a keyboard, keypad, mouse, trackball, trackpad, and/or cursor direction keys for communicating information and commands to processor 502.

System 500 also includes network interface 514 coupled to the processor 502. Network interface 514 allows system 500 to communicate with network 516, to which one or more other computer systems are connected. Network interface 514 includes wireless network interfaces such as BLUETOOTH, WIFI, WIMAX, GPRS, or WCDMA; or wired network interface such as ETHERNET, USB, or IEEE-1394. In some embodiments, method 200 (FIG. 2) or method 300 (FIG. 3) is implemented in two or more systems 500, and information is exchanged between different systems 500 via network 516.

System 500 includes display 518. Display 518 is electrically connected to the processor 502, storage medium 504, and I/O 512 via bus 510. Display 518 displays one or more user interfaces including user interface 400 (FIG. 4).

An aspect of this description relates to a system. The system includes a non-transitory computer readable medium configured to store instructions thereon. The system further includes a processor connected to the non-transitory computer readable medium. The processor is configured to execute the instructions for receiving optical fiber data related to a plurality of target areas for allocating optical fiber connectivity. The processor is further configured to execute the instructions for preparing a plurality of optical fiber connectivity requests corresponding to the plurality of target areas. The processor is further configured to execute the instructions for generating an optical fiber connectivity application based on the plurality of optical fiber connectivity requests. The processor is further configured to execute the instructions for instructing a transmitter to transmit the optical fiber connectivity application to an optical fiber provider. The processor is further configured to execute the instructions for receiving a response from the optical fiber provider, the response indicating whether the plurality of optical fiber connectivity requests is approved for optical fiber connectivity construction. In some embodiments, the processor is further configured to execute the instructions for updating the optical fiber connectivity application based on the data received from the optical fiber provider. In some embodiments, the processor is configured to execute the instructions for determining whether the response from the optical fiber provider is a positive response that the plurality of optical fiber connectivity requests is approved or a negative response that the plurality of optical fiber connectivity requests is not approved. In some embodiments, in response to determining the response being the negative response, the processor is configured to execute the instructions for updating the optical fiber connectivity application to obtain an updated optical fiber connectivity application, and the processor is configured to execute the instructions for instructing the transmitter to transmit the updated optical fiber connectivity application to the optical fiber provider. In some embodiments, in response to determining the response being the positive response, the processor is configured to execute the instructions for instructing the transmitter to transmit the positive response to a server to start the optical fiber connectivity construction. In some embodiments, the processor is configured to execute the instructions for selecting one or more group centers corresponding to the plurality of target sites to complete the plurality of optical fiber connectivity requests. In some embodiments, the data from the optical fiber provider includes a plurality of identifications respectively assigned to the plurality of optical fiber connectivity requests. In some embodiments, the processor is further configured to execute the instructions for monitoring date information indicating a date for the optical fiber connectivity construction or cost information indicating a cost for the optical fiber connectivity construction. In some embodiments, in response to receiving, from the optical fiber provider, the response including a response associated to one of the optical fiber connectivity requests, the processor is configured to execute the instructions for modifying the one of the plurality of optical fiber connectivity requests in the optical fiber connectivity application. In some embodiments, the system further includes a display connected to the non-transitory computer readable medium and the processor, and the processor is further configured to execute the instructions for causing the display to display information indicating a status of the optical fiber connectivity application, the status of the optical fiber connectivity application including at least one of a triggered state, a prepared state, or an approved state.

An aspect of this description relates to a method. The method includes receiving optical fiber data related to a plurality of target areas for allocating optical fiber connectivity. The method further includes preparing a plurality of optical fiber connectivity requests corresponding to the plurality of target areas. The method further includes generating an optical fiber connectivity application based on the plurality of optical fiber connectivity requests. The method further includes instructing a transmitter to transmit the optical fiber connectivity application to an optical fiber provider. The method further includes receiving a response from the optical fiber provider, the response indicating whether the plurality of optical fiber connectivity requests is approved for optical fiber connectivity construction. In some embodiments, the method further includes updating the optical fiber connectivity application based on the data received from the optical fiber provider. In some embodiments, the method further includes determining whether the response from the optical fiber provider is a positive response that the plurality of optical fiber connectivity requests is approved or a negative response that the plurality of optical fiber connectivity requests is not approved. In some embodiments, the method further includes in response to determining the response being the negative response, updating the optical fiber connectivity application to obtain an updated optical fiber connectivity application; and instructing the transmitter to transmit the updated optical fiber connectivity application to the optical fiber provider. In some embodiments, the method further includes in response to determining the response being the positive response, instructing the transmitter to transmit the positive response to a server to start the optical fiber connectivity construction. In some embodiments, the method further includes selecting a plurality of group centers corresponding to the plurality of target sites to complete the plurality of optical fiber connectivity requests. In some embodiments, the data from the optical fiber provider includes a plurality of identifications respectively assigned to the plurality of optical fiber connectivity requests. In some embodiments, the method further includes monitoring date information indicating a date for the optical fiber connectivity construction or cost information indicating a cost for the optical fiber connectivity construction. In some embodiments, the method further includes in response to receiving, from the optical fiber provider, the response including a response associated to one of the optical fiber connectivity requests, modifying the one of the plurality of optical fiber connectivity requests in the optical fiber connectivity application.

An aspect of this description relates to a non-transitory computer readable medium configured to store instructions for causing a processor executing the instructions to implement a method. The instructions cause the processor to receive optical fiber data related to a plurality of target areas for optical fiber connectivity. The instructions further cause the processor to prepare a plurality of optical fiber connectivity requests corresponding to the plurality of target areas for the optical fiber connectivity. The instructions further cause the processor to generate an optical fiber connectivity application based on the plurality of optical fiber connectivity requests. The instructions further cause the processor to instruct a transmitter to transmit the optical fiber connectivity application to an optical fiber provider. The instructions further cause the processor to receive a response from the optical fiber provider, the response indicating whether the plurality of optical fiber connectivity requests is approved for optical fiber connectivity construction.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical fiber connectivity management system, comprising:
    a non-transitory computer readable medium configured to store instructions thereon; and
    a processor connected to the non-transitory computer readable medium, wherein the processor is configured to execute the instructions for:
        receiving optical fiber data related to a plurality of target areas for optical fiber connection;
        preparing a plurality of optical fiber connection requests corresponding to the plurality of target areas for the optical fiber connection;
        generating an optical fiber application based on the plurality of optical fiber connection requests;
        instructing a transmitter to transmit the optical fiber application to an optical fiber provider; and
        receiving a response from the optical fiber provider, the response indicating whether the plurality of optical fiber connection requests is approved for optical fiber connection construction.

2. The optical fiber connectivity management system of claim 1, wherein the processor is configured to execute the instructions for
    receiving data from the optical fiber provider; and
    updating the optical fiber application based on the data received from the optical fiber provider.

3. The optical fiber connectivity management system of claim 1, wherein the processor is configured to execute the instructions for determining whether the response from the optical fiber provider is a positive response that the plurality of optical fiber connection requests is approved or a negative response that the plurality of optical fiber connection requests is not approved.

4. The optical fiber connectivity management system of claim 3, wherein
    in response to determining the response being the negative response, the processor is configured to execute the instructions for updating the optical fiber application to obtain an updated optical fiber application, and
    the processor is configured to execute the instructions for instructing the transmitter to transmit the updated optical fiber application to the optical fiber provider.

5. The optical fiber connectivity management system of claim 3, wherein, in response to determining the response being the positive response, the processor is configured to execute the instructions for instructing the transmitter to transmit the positive response to a server to start the optical fiber connection construction.

6. The optical fiber connectivity management system of claim 2, wherein
    the data received from the optical fiber provider includes group center information related to a group center connected to a base station via optical fibers, and
    the processor is configured to execute the instructions for
        allocating the group center information to an east region and a west region; and
        generating the optical fiber application for the east region or the west region.

7. The optical fiber connectivity management system of claim 2, wherein the data from the optical fiber provider includes an identifier associated with the optical fiber application.

8. The optical fiber connectivity management system of claim 1, wherein the processor is configured to execute the instructions for monitoring date information indicating a date for the optical fiber connection construction or cost information indicating a cost for the optical fiber connection construction.

9. The optical fiber connectivity management system of claim 1, wherein the processor is configured to execute the instructions for modifying the plurality of optical fiber connection requests in the optical fiber application after the optical fiber application is approved.

10. The optical fiber connectivity management system of claim 1, further comprising a display connected to the non-transitory computer readable medium and the processor, wherein
    the processor is configured to execute the instructions for causing the display to display information indicating a status of the optical fiber application, the status of the optical fiber application including at least one of a triggered state, a prepared state, or an approved state.

11. An optical fiber connectivity management method, comprising:
receiving optical fiber data related to a plurality of target areas for optical fiber connection;
preparing a plurality of optical fiber connection requests corresponding to the plurality of target areas for the optical fiber connection;
generating an optical fiber application based on the plurality of optical fiber connection requests;
instructing a transmitter to transmit the optical fiber application to an optical fiber provider; and
receiving a response from the optical fiber provider, the response indicating whether the plurality of optical fiber connection requests is approved for optical fiber connection construction.

12. The optical fiber connectivity management method of claim 11, further comprising:
receiving data from the optical fiber provider; and
updating the optical fiber application based on the data received from the optical fiber provider.

13. The optical fiber connectivity management method of claim 11, further comprising:
determining whether the response from the optical fiber provider is a positive response that the plurality of optical fiber connection requests is approved or a negative response that the plurality of optical fiber connection requests is not approved.

14. The optical fiber connectivity management method of claim 13, further comprising:
in response to determining the response being the negative response, updating the optical fiber application to obtain an updated optical fiber application; and
instructing the transmitter to transmit the updated optical fiber application to the optical fiber provider.

15. The optical fiber connectivity management method of claim 13, further comprising:
in response to determining the response being the positive response, instructing the transmitter to transmit the positive response to a server to start the optical fiber connection construction.

16. The optical fiber connectivity management method of claim 12, wherein
the data received from the optical fiber provider includes group center information related to a group center connected to a base station via optical fibers, and
the method further comprises:
allocating the group center information to an east region and a west region; and
generating the optical fiber application for the east region or the west region.

17. The optical fiber connectivity management method of claim 12, wherein the data from the optical fiber provider includes an identifier associated with the optical fiber application.

18. The optical fiber connectivity management method of claim 11, further comprising:
monitoring date information indicating a date for the optical fiber connection construction or cost information indicating a cost for the optical fiber connection construction.

19. The optical fiber connectivity management method of claim 11, wherein the plurality of optical fiber connection requests in the optical fiber application is modifiable after the optical fiber application is approved.

20. A non-transitory computer readable medium configured to store instructions for causing a processor executing the instructions to implement an optical fiber connectivity management method comprising:
receiving optical fiber data related to a plurality of target areas for optical fiber connection;
preparing a plurality of optical fiber connection requests corresponding to the plurality of target areas for the optical fiber connection;
generating an optical fiber application based on the plurality of optical fiber connection requests;
instructing a transmitter to transmit the optical fiber application to an optical fiber provider; and
receiving a response from the optical fiber provider, the response indicating whether the plurality of optical fiber connection requests is approved for optical fiber connection construction.

* * * * *